US008979106B2

United States Patent
Benoit et al.

(10) Patent No.: US 8,979,106 B2
(45) Date of Patent: Mar. 17, 2015

(54) TIRE PROTECTION MOUNT

(71) Applicants: Merle Benoit, Kankakee, IL (US); Eric Kirchner, Kankakee, IL (US)

(72) Inventors: Merle Benoit, Kankakee, IL (US); Eric Kirchner, Kankakee, IL (US)

(73) Assignee: Shoup Manufacturing Company, Kankakee, IL (US)

( * ) Notice: Subject to any disclaimer, the term of this patent is extended or adjusted under 35 U.S.C. 154(b) by 0 days.

(21) Appl. No.: 14/071,012

(22) Filed: Nov. 4, 2013

(65) Prior Publication Data
US 2014/0131973 A1 May 15, 2014

Related U.S. Application Data

(60) Provisional application No. 61/725,308, filed on Nov. 12, 2012.

(51) Int. Cl.
B60R 19/54 (2006.01)
A01D 34/835 (2006.01)

(52) U.S. Cl.
CPC ............ B60R 19/54 (2013.01); A01D 34/8355 (2013.01)
USPC .............................................. 280/160; 56/52

(58) Field of Classification Search
CPC .. A01D 75/187; A01D 34/8355; B60R 19/00; B60R 19/54; B60R 19/55
USPC ............. 280/727, 160, 855; 56/52, 119, 17.4, 56/DIG. 3, 314
See application file for complete search history.

(56) References Cited

U.S. PATENT DOCUMENTS

| 2,687,001 | A | * | 8/1954 | Valentine | 56/299 |
| 4,144,698 | A | * | 3/1979 | Shelton | 56/1 |
| 4,835,954 | A | * | 6/1989 | Enzmann | 56/303 |
| 4,991,385 | A | | 2/1991 | Klinner | |
| 5,241,780 | A | * | 9/1993 | Zaun et al. | 47/1.7 |
| 6,289,659 | B1 | * | 9/2001 | Fox | 56/10.2 E |
| 6,539,697 | B2 | | 4/2003 | Burk | |
| 6,648,078 | B1 | | 11/2003 | Mofett et al. | |
| 7,658,058 | B2 | | 2/2010 | Pierson | |
| 7,817,737 | B2 | | 10/2010 | Pierson | |
| 8,418,432 | B2 | * | 4/2013 | Shoup | 56/10.2 E |
| 2002/0112461 | A1 | * | 8/2002 | Burk | 56/504 |
| 2011/0260425 | A1 | | 10/2011 | Meakins | |
| 2013/0061569 | A1 | * | 3/2013 | McClenathen | 56/52 |
| 2013/0177348 | A1 | * | 7/2013 | Hyronimus et al. | 403/164 |

OTHER PUBLICATIONS

Stalk Crusher, "Stalk Crusher for Stubble Damage Protection," retrieved from http://www.stalkcrucher.com, Oct. 28, 2011, 1 page.
May Wes, "Stalk Stomper for Stubble Damage Protection," retrieved from http://www.maywes.com/stalk_stompers_combines, Oct. 28, 2011, 2 pages.
NDY Manufacturing, "Stalk Stompers," and accompanying images, retrieved from http://ndymfg.com/Products.php, Oct. 28, 2011, 6 pages.
CFC Distributors, Inc., "Stalk Stompers," www.cfcdist.com, Jan. 2011 Catalog, pp. 119-121.

* cited by examiner

Primary Examiner — John Walters
Assistant Examiner — Brian Swenson
(74) Attorney, Agent, or Firm — Vedder Price PC

(57) ABSTRACT

A tire protection mount may include a bracket that includes a central platform and an arm. The central platform is connected the arm to define an opening. The tire protection mount further includes a shield connected to the bracket that substantially covers the opening.

6 Claims, 4 Drawing Sheets

TIRE PROTECTION MOUNT

RELATED APPLICATIONS

This application is based on and claims priority to provisional U.S. Patent Application No. 61/725,308, filed Nov. 12, 2012, the contents of which are herein incorporated by reference.

FIELD OF THE DISCLOSURE

The present disclosure generally relates to protecting a vehicle from damage by harvest debris and, more particularly, to a method and assembly for deflecting harvest debris from a mount for an apparatus that displaces ground debris into positions that prevent vehicle tire damage and thereby protecting the vehicle from damage by the harvest debris or delays in operation of the vehicle due to necessary removal of the harvest debris to avoid further damage. The technology of this disclosure may be particularly suited, in one embodiment, to protecting farm equipment.

BACKGROUND

Ground and harvest debris can pose a damage hazard to many types of vehicles. For example, in agricultural settings ground and harvest debris, such as corn stalks, can be equally detrimental to not only vehicle tires, but also the vehicle itself. Modern techniques for harvesting fibrous crops such as corn, and the like, require cutting or breaking the hard, rigid stalks several inches from the ground. The stubble that remains in the ground debris poses a hazard to the tires of farm equipment and farm equipment tires may represent a substantial financial investment, often costing in the thousands of dollars. As a result, many conventional technologies may have been developed to protect tires from damage by ground debris, especially for agricultural applications. However, the harvest debris is also likewise damaging to the vehicle. For example, conventional technology used to mount certain tire protection devices have openings that are exposed to the harvest debris. As a result, the harvest debris is captured and accumulates in the openings. After a period of time, the openings are packed full of harvest debris which is then often captured or accumulates elsewhere. The harvest debris can damage the mounts for the tire protection assemblies and other components of the vehicle to which such assemblies are connected. In addition, the accumulated harvest debris, over time, can decompose and exude malodorous fumes. These fumes can create an unpleasant environment for users that operate the vehicle.

The foregoing problems regarding the lack of protection techniques from harvest debris represent a long-felt need for an effective solution to the same. While implementing elements may have been available, actual attempts to meet this need may have been lacking. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present technology and may even result in the achievements of the present technology being considered to some degree an unexpected result of the approach taken.

Therefore, there is a need in the art for a method and assembly that can be used in connection with a vehicle, such as farm equipment, that effectively reduces the damage to the vehicle from harvest debris that may come into contact with the tires or other components of the vehicle. There additionally is a need for a method and assembly that prevents the accumulation of havest debris in or on the components that are attached to the vehicle to assist in the prevention of damage to the tires or other components of the vehicle. Still further, there is a need to prevent malodorous fumes from being produced due to the confinement of accumulated harvest debris.

SUMMARY

A tire protection mount may include a bracket that includes a central platform and an arm. The central platform is connected to the arm to define an opening. The tire protection mount further includes a shield connected to the bracket that substantially covers the opening.

In another example, the tire protection mount further includes a second arm wherein the second arm is also connected to the central platform to further define the opening.

In another example, the shield of the tire protection mount is configured to substantially cover a width and a height of the opening, the width defined by a distance between the arm and the second arm and the height defined by a distance between the central platform and the mounting flange.

In another example, the shield of the tire protection mount is connected to the bracket via releasable fasteners.

In another example, the tire protection mount further includes a skid attachment connected to the central platform of the bracket. The skid attachment includes a forward-facing deflector element configured to guide harvest debris toward the ground.

In another example, the shield of the tire protection mount is positioned at an angle substantially aligned with the forward-facing deflector element of the skid attachment.

In another example, the shield of the tire protection mount is shaped to substantially surround a cylinder element of a vehicle to which the tire protection mount may be attached.

In still another example, the tire protection mount further includes a spacer that includes a first attachment point and a second attachment point. The first attachment point connecting the spacer to a mounting flange on the bracket and the second attachment point configured to attach the spacer to a vehicle.

BRIEF DESCRIPTION OF THE DRAWINGS

The disclosure will be more readily understood in view of the following description when accompanied by the below figures and wherein like reference numerals represent like elements, wherein.

DETAILED DESCRIPTION

Figure 1:
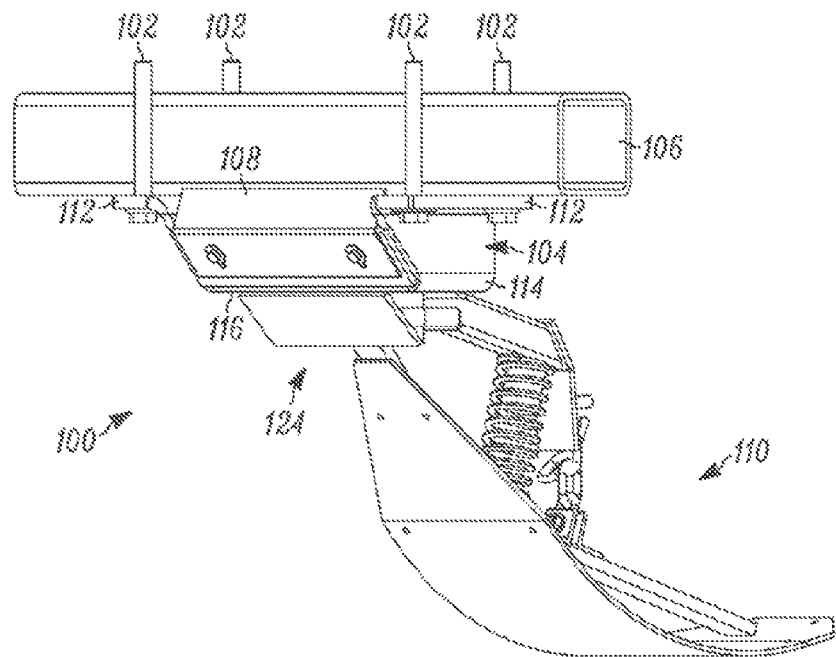
FIG. 1 is a perspective view of one embodiment of the tire protection mount of the present disclosure.
Figure 2:
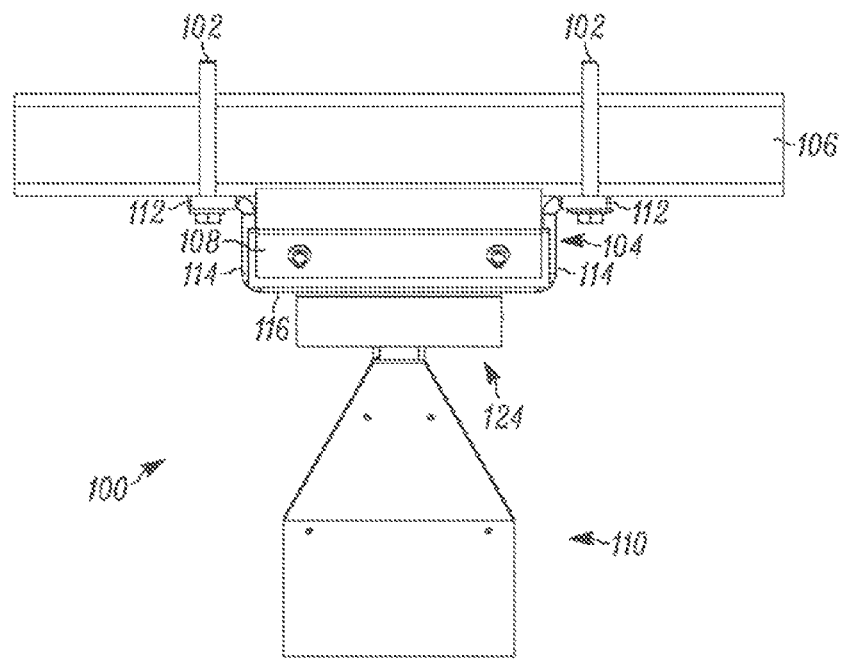
FIG. 2 is a front view of the tire protection mount of FIG. 1.
Figure 3:
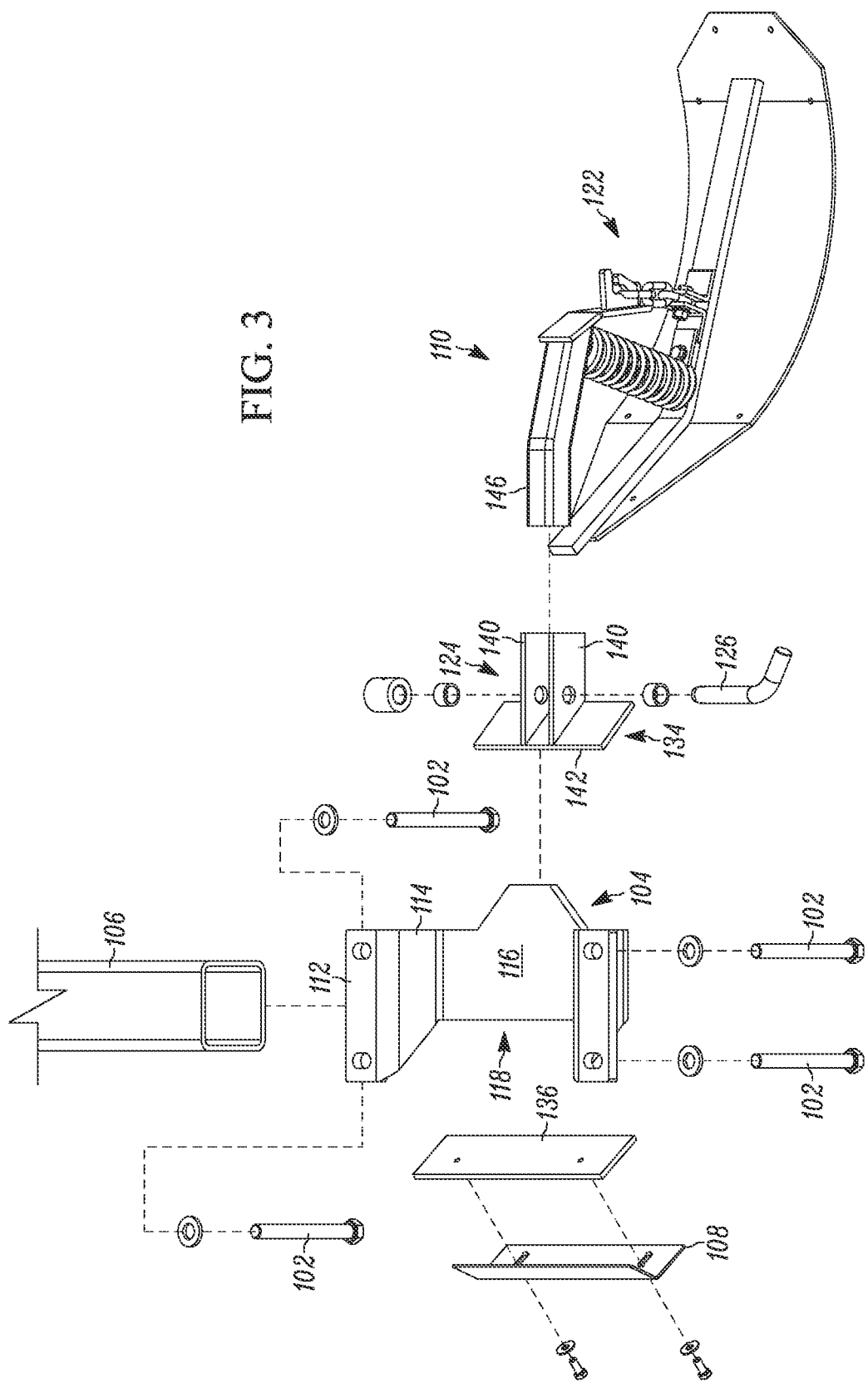
FIG. 3 is an exploded view of the tire protection mount of FIG. 1.
Figure 4:
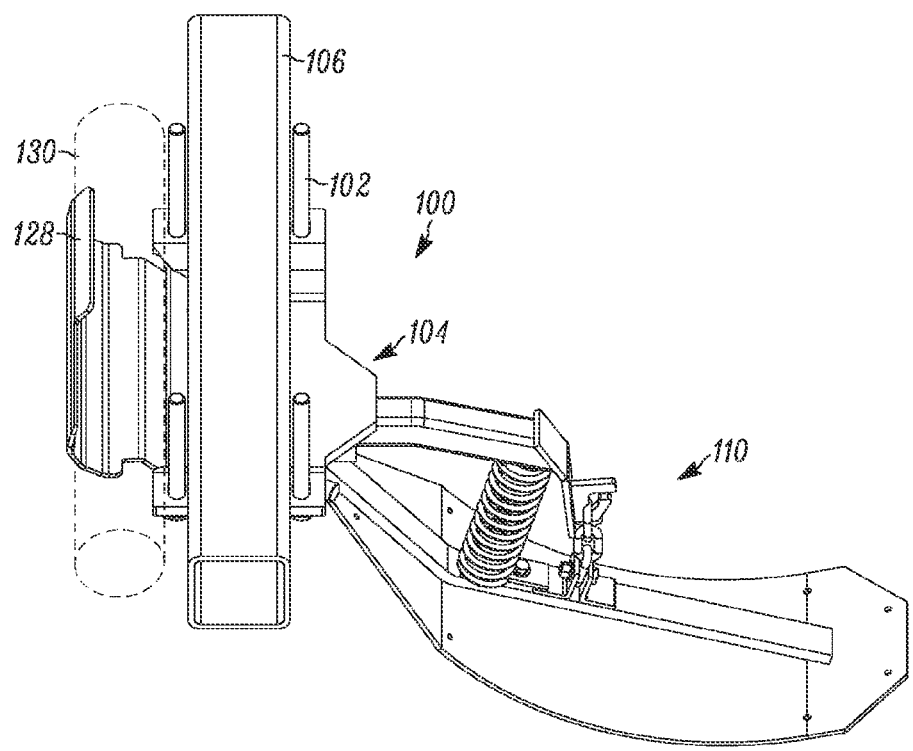
FIG. 4 is an upper perspective view of another embodiment of the tire protection mount of the present disclosure.
Figure 5:
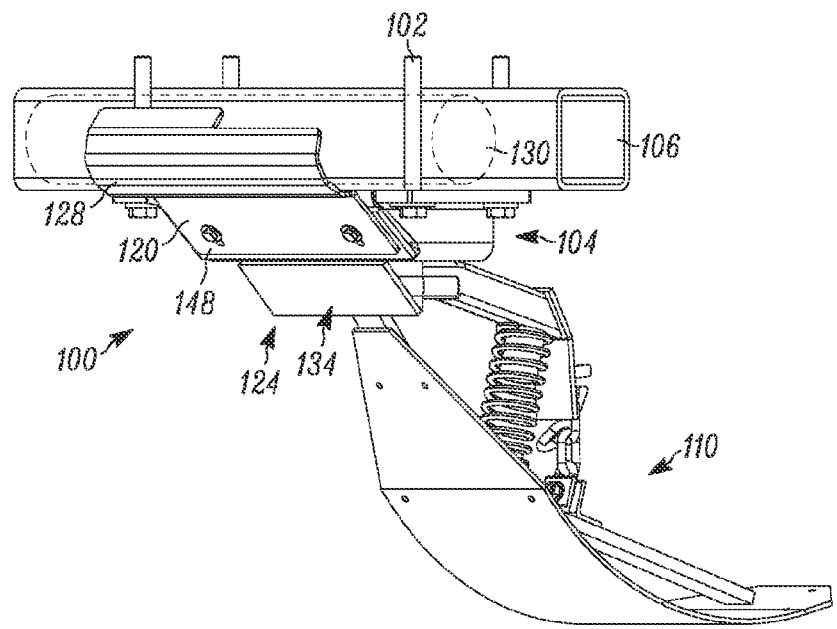
FIG. 5 is a lower perspective view of the tire protection mount of FIG. 4.
Figure 6:
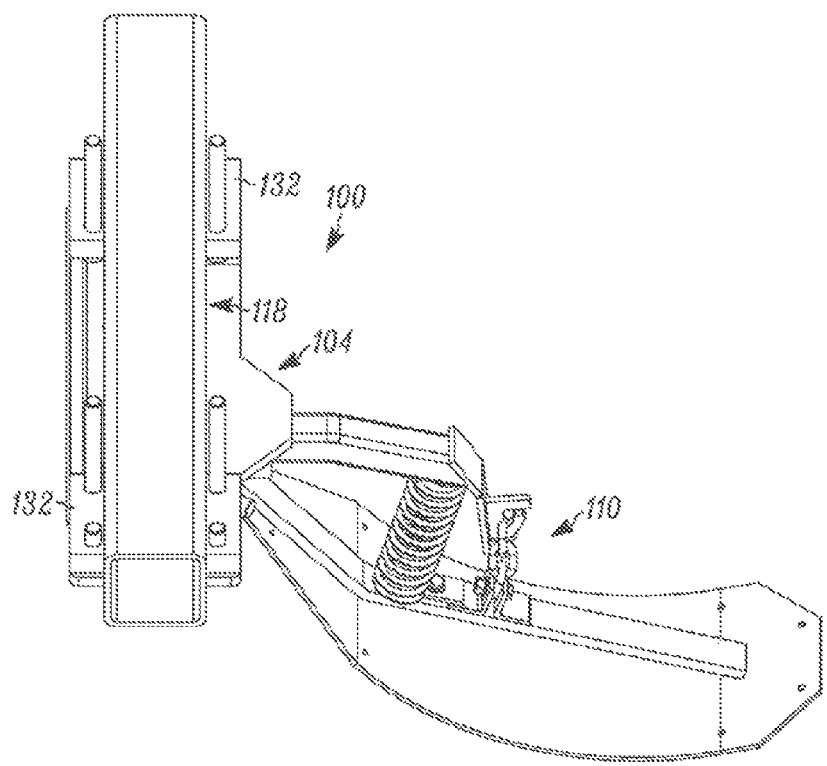
FIG. 6 is an upper perspective view of another embodiment of the tire protection mount of the present disclosure.
Figure 7:
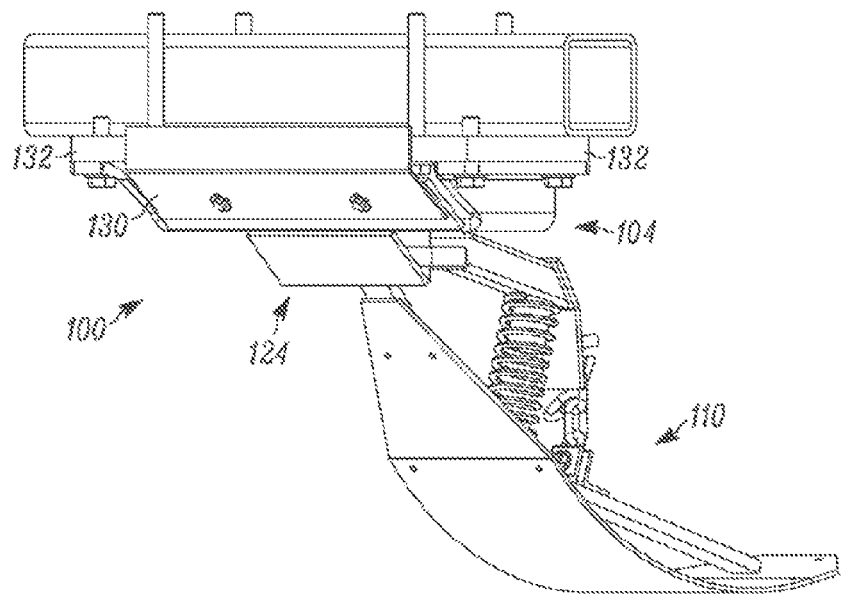
FIG. 7 is a lower perspective view of the tire protection mount of FIG. 6.

The following description of the embodiments is merely exemplary in nature and is in no way intended to limit the disclosure, its application, or uses. FIGS. 1-3 illustrate one embodiment of the tire protection mount of the present disclosure. FIGS. 4 and 5 illustrate another embodiment of the tire protection mount of the present disclosure. FIGS. 6 and 7 illustrate another embodiment of the tire protection mount of the present disclosure.

FIGS. 1-3 illustrate one embodiment of a tire protection mount 100 that may include a plurality of fasteners 102 that secure a bracket 104 to a portion of the vehicle 106, a shield 108 connected to the bracket 104 and a ground debris assembly 110 movably connected to the bracket 104. Preferably, the bracket 104 is formed from a single, unitary element by forming, bending, or the like so as to provide mounting flanges 112 offset by a pair of arms 114 from a central platform 116, rather than an assembly of three or more components connected by welding, or the like. The flanges 112 may facilitate connection of the bracket 104 to the vehicle 106 by the fasteners 102. The arms 114 and platform 116 cooperatively define an opening 118 with a portion that without a shield 108 or 120 would be subject to accumulation and damage from harvest debris. The shield 108 or 120 may be connected to the bracket 104 by any suitable fastener or process, such as welding, adhesive, or the like, and configured to substantially and materially cover the opening 118 so as to prevent accumulation of harvest debris. In one example, shield 107 or 120 includes releasable fasteners that attaches shield 108 or 120 to bracket 104 and additionally allow shield 108 or 120 be removed from bracket 104 for servicing or cleaning. Preferably, the shield 108 or 120 and the bracket 104 present an angled surface to the direction of oncoming harvest debris so that the harvest debris is deflected toward the ground whereby potential damage to the vehicle is further reduced.

As can be seen in FIG. 3, in one embodiment shield 108 is attached to bracket 104 via plate 136. In this embodiment plate is a separate piece of material that is welded to the forward edges of arms 114. The forward edges of arms 114 can be configured in a way so as when plate is attached, plate 136 is positioned at an advantageous angle with respect to the ground such that when shield 108 is attached, plate 136 and shield 108 or 120 assist in deflecting debris toward the ground. In another embodiment, plate 136 may be formed as an integral member of bracket 104. In such an embodiment, plate 136 and bracket 104 including arms 114, mounting flanges 112 and central platform 116 can be created from a single piece of material that is formed to the shape previously described. In other embodiments, the shield 108 or 120 and the elements of bracket 104, such as arms 114, mounting flanges 112, central platform 116 can be separate elements that are joined or connected together via any suitable technique such as welding, via fasteners, adhesive, or the like.

The ground debris assembly 110 may include a skid attachment 124 that is connected to the bottom of the platform 116 in a conventional manner, such as, fasteners, welding, or the like. A skid shoe assembly 122 is pivotally connected to the skid attachment 124 by a pivot pin 126. Preferably, the skid attachment 124 includes an angled forward-facing deflector element 134 that is cooperative with the angled surface of the shield 108 or 120 to achieve the same functionality (i.e., deflection of oncoming harvest debris toward the ground whereby potential damage to the vehicle is reduced). As can be seen in FIG. 3, skid attachment 124 can include forward facing surface 142 of deflector element 134 and a plurality of support legs 140. In this embodiment, support legs 140 are two elongated members that are in a substantially parallel arrangement to one another. Each of the support legs 140, in this embodiment, are positioned at predetermined distance from one another such that bar 146 of skid shoe assembly 122 fits between support legs 140 and can be connected to skid attachment 124 via connector 126. Other configurations of attachment of skid shoe assembly 122 can also be used.

As can be seen in the embodiments shown in FIGS. 5 and 7, deflector element 134 of skid attachment 124 can be configured such that deflector element and a lower face 148 of shield 108 or 120 are substantially aligned. In this configuration, lower face 148 and deflector element 134 can be co-planar and present a common surface to deflect incoming harvest debris in a downward direction toward the ground. In other embodiments, other configurations can also be used. For example, deflector surface 134 and shield 108 or 120 may be rounded or include other forward-facing shapes that may deflect debris to the sides of bracket 104 or may be configured to lie in different planes.

FIGS. 4 and 5 illustrate another embodiment of the tire protection mount 100 wherein the shield 120 includes an upper extension 128 to protect a cylinder portion 130 of the vehicle (shown in dashed lines for clarity) from damage due to harvest debris, in the same manner. Otherwise, the remainder of the tire protection mount can be the same. As can be seen in FIG. 5, the connection point of shield 120 to skid attachment 124 is below cylinder portion 130 such that cylinder portion 130 is surrounded by shield 120 but no connection is required to cylinder portion 130. The upper extension 128 may include an angled or curved front surface that deflects harvest debris in the direction of the ground to the extent possible. As can be appreciated, different configuration of shield 120 and upper extension 128 can also be used with different size cylinder portions 130, with other shaped elements that may reside on the vehicle where accumulation of harvest debris may occur or with other elements that may reside on the vehicle that may require extra protection from damage.

FIGS. 6 and 7 illustrate another embodiment of the tire protection mount 100 wherein the bracket 104 has increased width to accommodate vehicle dimensions. In this embodiment, spacers 132 facilitate connection of the increased width of the bracket 104 to the portion of the vehicle 106. Likewise, the shield 120 also has an increased width to accommodate the increased area of the opening 118. Spacers 132 may include two attachment points. One set of attachment points attach spacers 132 to mounting flanges 112 and a second set of attachment points attach spacers 132 to a portion of a vehicle 106. The dimensions of spacers 132 can be adjusted and configured to as to accommodate varying vehicle and bracket sizes.

The above detailed description and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. A tire protection mount for attaching a debris deflection assembly to a portion of a vehicle comprising:
a bracket including a first mounting flange, a second mounting flange, a first arm, a second arm, a central platform and a plate, said first mounting flange and said second mounting flange providing surfaces at which said bracket is attached to said portion of said vehicle, said first arm and said second arm extending vertically from said first mounting flange and said second mounting flange respectively, said central platform connecting said first arm to said second arm, and said plate including a shield attachment and connected to a forward edge of said central platform;

a shield connected to said shield attachment, said shield substantially covering an opening defined by said central platform, said first arm and said second arm; and a skid attachment including a debris deflector element and a plurality of support legs, said skid attachment connected to said central platform, said debris deflector element including a forward facing surface that is substantially aligned with said shield, and said support legs including a connector for attachment of said debris deflection assembly.

2. The tire protection mount of claim 1 wherein the shield is connected to said bracket via releasable fasteners.

3. The tire protection mount of claim 1 wherein said shield is positioned on said bracket at an angle relative to said central platform to guide harvest debris toward the ground.

4. The tire protection mount of claim 1 wherein said shield is positioned on said bracket at an angle substantially aligned with said forward-facing deflector element of said skid attachment.

5. The tire protection mount of claim 1 wherein said shield is shaped to substantially surround a cylinder element of the vehicle.

6. The tire protection mount of claim 1 further comprising a spacer, said spacer including a first attachment point and second attachment point, said first attachment point connecting said spacer to said mounting flange and said second attachment configured to attach said spacer to the vehicle.

* * * * *